US009923378B2

(12) United States Patent
Cao et al.

(10) Patent No.: US 9,923,378 B2
(45) Date of Patent: Mar. 20, 2018

(54) ENERGY FLOW CONTROLLER

(71) Applicant: EMPIRE TECHNOLOGY DEVELOPMENT LLC, Wilmington, DE (US)

(72) Inventors: Junwei Cao, Haidian District (CN); Zijing Yang, Haidian District (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/031,394

(22) PCT Filed: Mar. 6, 2015

(86) PCT No.: PCT/CN2015/073746
§ 371 (c)(1),
(2) Date: Apr. 22, 2016

(87) PCT Pub. No.: WO2016/141505
PCT Pub. Date: Sep. 15, 2016

(65) Prior Publication Data
US 2017/0117712 A1 Apr. 27, 2017

(51) Int. Cl.
*H02J 4/00* (2006.01)
*G06F 1/28* (2006.01)
(Continued)

(52) U.S. Cl.
CPC ............... *H02J 4/00* (2013.01); *G06F 1/28* (2013.01); *H02J 7/0063* (2013.01); *H02J 13/00* (2013.01)

(58) Field of Classification Search
CPC ............. H02J 2003/003; H02J 13/00; H02J 2007/0001; H02J 7/0013; H02J 7/0024;
(Continued)

(56) References Cited

U.S. PATENT DOCUMENTS 7,890,776 B2  2/2011  Diab et al.
8,179,102 B2  5/2012  Alberth, Jr. et al.
(Continued)

FOREIGN PATENT DOCUMENTS

CN   201066822 Y   5/2008
CN   103715737 A   4/2014
WO   2012125968 A1  9/2012

OTHER PUBLICATIONS

International Search Report and Written Opinion for International Application No. PCT/CN2015/073746 dated Dec. 2, 2015, 11 pages.

*Primary Examiner* — Rexford Barnie
*Assistant Examiner* — Thai Tran
(74) *Attorney, Agent, or Firm* — Moritt Hock & Hamroff LLP; Steven S. Rubin, Esq.

(57) ABSTRACT

Technologies effective to control a distribution of energy from an energy source to a first device and to a second device are generally described. In some examples, a controller may receive first device data and second device data, from the first device and the second device, respectively. The first device data may indicate first energy consumption by the first device and a first current energy quantity of the first device. The second device data may indicate second energy consumption by the second device and a second current energy quantity of the second device. The controller may control a first switch and a second switch, based on the first and second device data, to allow a first transmission of first energy from the energy source to the first device, and to interrupt a second transmission of second energy from the energy source to the second device.

18 Claims, 7 Drawing Sheets

(51) Int. Cl.
*H02J 13/00* (2006.01)
*H02J 7/00* (2006.01)

(58) Field of Classification Search
CPC .................. H02J 7/0031; H02J 7/0068; H02J 2007/0096; H02J 2007/0098; H02J 7/04; H02J 7/085; H02J 9/002; H02J 13/001; H02J 13/0017; H02J 13/0062; H02J 13/0079; H02J 13/0086
USPC ............................ 307/31; 700/286, 291, 295
See application file for complete search history.

(56) References Cited

U.S. PATENT DOCUMENTS

| | | | |
|---|---|---|---|
| 2004/0073597 A1* | 4/2004 | Caveney | H04L 12/10 709/200 |
| 2005/0174091 A1 | 8/2005 | Dayan et al. | |
| 2007/0135086 A1* | 6/2007 | Stanford | H04L 12/10 455/402 |
| 2008/0265836 A1 | 10/2008 | Inoue et al. | |
| 2008/0265838 A1 | 10/2008 | Garg et al. | |

* cited by examiner

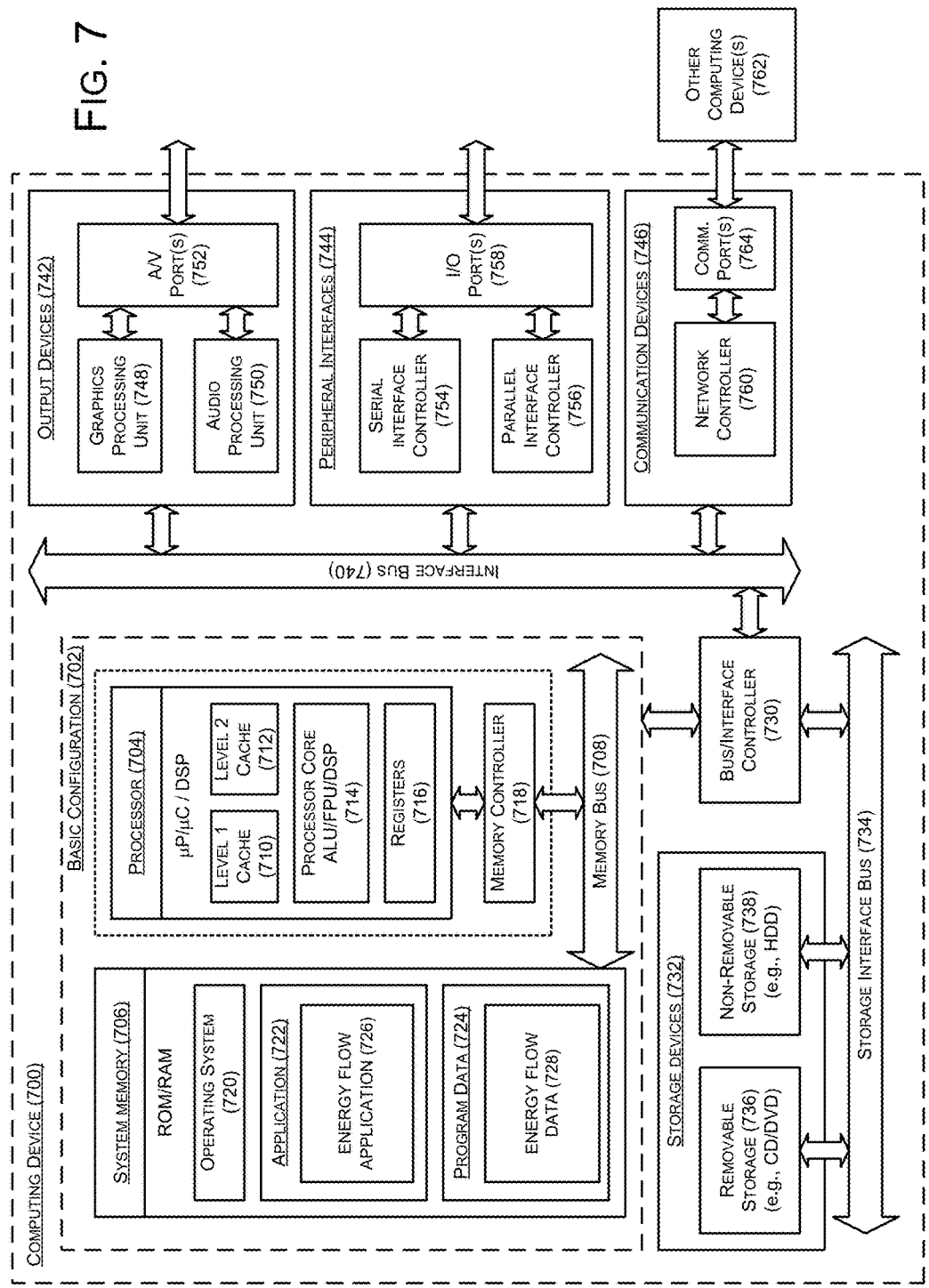

ENERGY FLOW CONTROLLER

CROSS REFERENCE TO RELATED APPLICATION

This application is a U.S. National Stage filing under 35 U.S.C. § 371 of International Application No. PCT/CN2015/073746, filed on Mar. 6, 2015. International Application No. PCT/CN2015/073746 is incorporated herein by reference in its entirety.

BACKGROUND

Unless otherwise indicated herein, the materials described in this section are not prior art to the claims in this application and are not admitted to be prior art by inclusion in this section.

User devices such as cellular phones and laptop computers may execute one or more applications. Even when not executing any application, a user device typically consumes an amount of energy. In contrast, when executing an application, the user device consumes a greater amount of energy as compared to when not executing the application.

SUMMARY

In some examples, methods to control a distribution of energy from an energy source to a first device and to a second device are generally described. The methods may include receiving, by a controller, first device data from the first device. The first device data may be effective to indicate a first energy consumption by the first device. The first device data may relate to a first current energy quantity of the first device. The methods may also include receiving, by the controller, second device data from the second device. The second device data may be effective to indicate a second energy consumption by the second device. The second device data may relate to a second current energy quantity of the second device. The methods may also include controlling, by the controller, a first switch, based on the first device data and second device data, to allow a first transmission of first energy from the energy source to the first device. The methods may also include controlling, by the controller, a second switch, based on the first device data and second device data, to interrupt a second transmission of second energy from the energy source to the second device.

In some examples, systems effective to control a distribution of energy to a first device and to a second device are generally described. The systems may include a first module, where the first module may include a first interface that may be effective to connect the first device to an energy source. The first module may also include a second interface that may be effective to connect the second device to the energy source. The systems may also include a second module that may be configured to be in communication with the first module. The systems may also include a third module that may be configured to be in communication with the first module and the second module. The third module may include a first switch that may be configured to be in communication with the first interface of the first module. The third module may also include a second switch that may be configured to be in communication with the second interface of the first module. The first module may be configured to receive first device data from the first device through the first interface. The first device data may be effective to indicate a first energy consumption by the first device. The first device data may relate to a first current energy quantity of the first device. The first module may be further configured to receive second device data from the second device through the second interface. The second device data may be effective to indicate a second energy consumption by the second device. The second device data may relate to a second current energy quantity of the second device. The first module may be further configured to send the first and second device data to the second module. The second module may be configured to control the first switch of the third module, based on the first device data and second device data, to allow a first transmission of first energy from the energy source to the first device. The second module may be further configured to control the second switch of the third module, based on the first device data and second device data, to interrupt a second transmission of second energy from the energy source to the second device.

In some examples, energy controllers effective to control a distribution of energy to a first device and to a second device are generally described. The energy controllers may include an energy source that may be configured to store the energy. The energy controllers may also include a first interface that may be effective to connect the first device to the energy source. The first interface may be configured to receive first device data from the first device. The first device data may be effective to indicate a first energy consumption by the first device. The first device data may relate to a first current energy quantity of the first device. The energy controllers may also include a second interface that may be effective to connect the second device to the energy source. The second interface may be configured to receive second device data from the second device. The second device data may be effective to indicate a second energy consumption by the second device. The second device data may relate to a second current energy quantity of the second device. The energy controllers may also include a processor that may be configured to be in communication with the first interface and the second interface. The energy controllers may also include a first switch that may be configured to be in communication with the first interface and the processor. The energy controllers may also include a second switch that may be configured to be in communication with the second interface and the processor. The processor may be configured to control the first switch based on the first device data and second device data, to allow a first transmission of first energy from the energy source to the first device. The processor may also be configured to control the second switch based on the first device data and second device data, to interrupt a second transmission of second energy from the energy source to the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement an energy flow controller;

Figure 1:
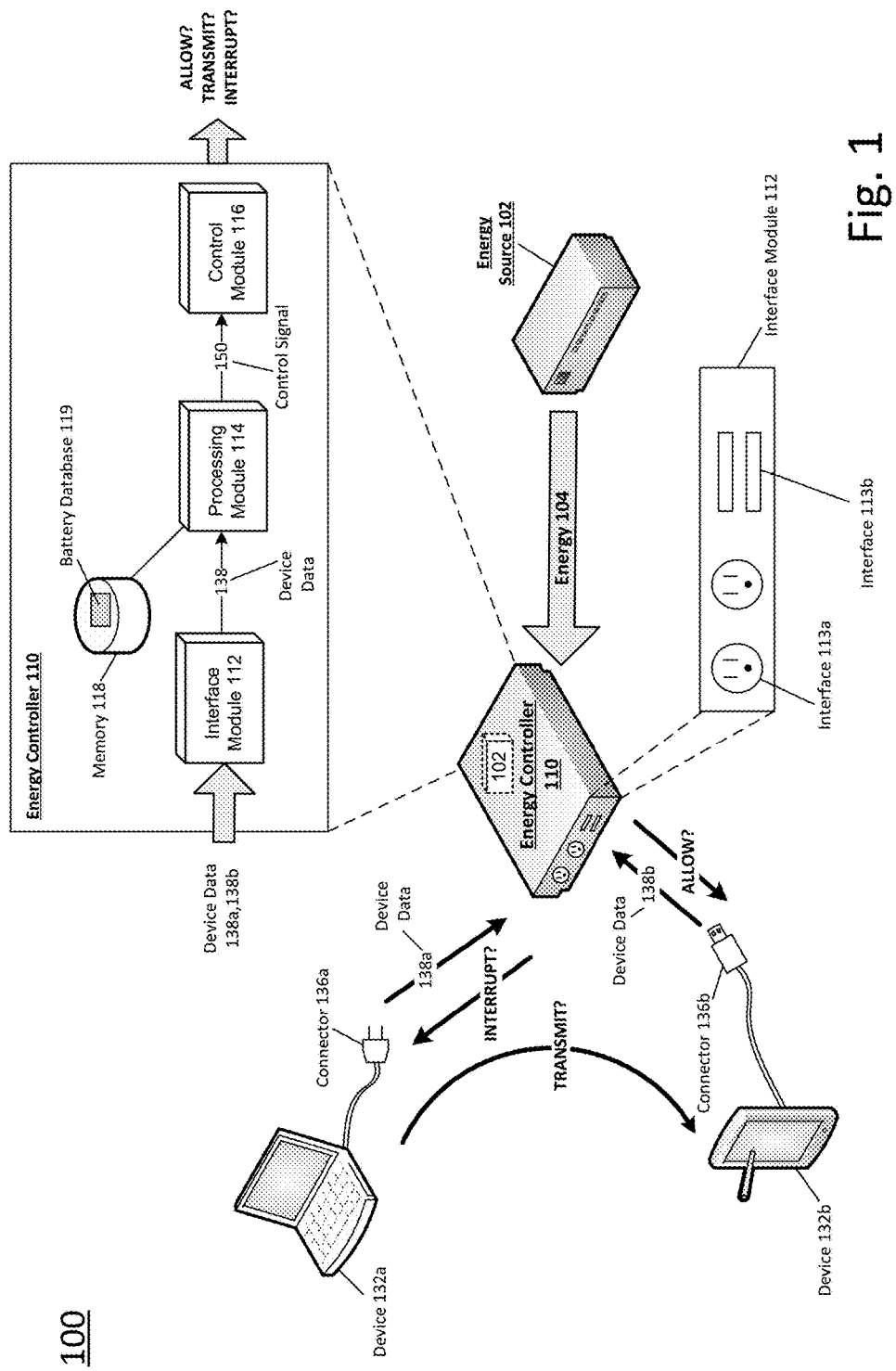
FIG. 1 illustrates an example system that can be utilized to implement an energy flow controller.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, technologies effective to control a distribution of energy from an energy source to a first device and to a second device are generally described. In some examples, the first and second devices may be cellular phones, computers, etc. In some examples, a controller may receive first device data and second device data, from the first device and the second device, respectively. The first device data may indicate first energy consumption by the first device and a first current energy quantity of the first device. For example, the first device data may indicate a first number of device applications being executed and/or suspended by the first device, a first routine that relates to executions of the device applications by the first device, and a first battery type of a first battery of the first device, etc. The second device data may indicate second energy consumption by the second device and a second current energy quantity of the second device. For example, the second device data may indicate a second number of device applications being executed and/or suspended by the second device, a second routine that relates to executions of the device applications by the second device, and a second battery type of a second battery of the second device, etc. The controller may evaluate the received first and second device data in order to determine whether the first and second devices require energy, which device may be prioritized to receive energy, which device may not need energy, etc. The controller may control a first switch and a second switch, based on the first and second device data, to allow a first transmission of first energy from the energy source to the first device, and to interrupt a second transmission of second energy from the energy source to the second device. For example the controller may generate control signals based on the evaluations of the first and second device data, where the controls signals may be effective to control the first and second switches in order to allow and/or interrupt transmission of energy to the first and second devices.

FIG. 1 illustrates an example system 100 that can be utilized to implement an energy flow controller, arranged in accordance with at least some embodiments described herein. System 100 may be implemented with an energy controller 110. As will be described in more detail below, system 100 may be implemented such that energy controller 110 may control a distribution of energy 104 to devices 132 (including device 132a, 132b) based on device data 138 (including device data 138a, 138b), where device data 138 may be provided by or received from devices 132. Energy 104 may be energy supplied by an energy source 102 such as a generator, a battery, etc. In some examples, energy source 102 may be a component, such as a battery, of energy controller 110 and may be disposed inside or as part of energy controller 110. Devices 132 may include cellular phones, computers, etc. In some examples, energy controller 110 may control the distribution of energy 104 to devices 132 by, for example, allowing energy 104 to be transmitted to devices 132 from energy source 102. In some examples, energy controller 110 may control the distribution of energy 104 to devices 132 by interrupting a transmission of energy 104 to devices 132 from energy source 102. In some examples, energy controller 110 may control the distribution of energy 104 to devices 132 by instructing device 132a to transmit energy to device 132b.

Energy controller 110 and energy source 102 may be configured to be in communication with each other. Energy controller 110 may include an interface module 112, a processing module 114, a control module 116, and/or a memory 118. Interface module 112, processing module 114, and/or control module 116 may be configured to be in communication with each other. Processing module 114 may be configured to be in communication with memory 118. Interface module 112 may include one or more interfaces effective to electrically connect devices 132 to energy controller 110 and/or energy source 102. In the example depicted, interface module 112 may include interfaces 113 (including interfaces 113a, 113b) where each interface 113 may be a particular type of interface. For example, interface 113a may be an AC (Alternating Current) socket, and interface 113b may be a USB (Universal Serial Bus) socket. In the example, device 132a may connect to interface 113a through a connector 136a in order to connect to energy controller 110 and/or access energy source 102. Similarly, device 132b may connect to interface 113b through a connector 136b in order to connect to energy controller 110 and/or access energy source 102. In some examples, interface module 112 may include electronic circuits, such as integrated circuits, and/or sensors (further described below), configured to facilitate detection of devices 132 that may be connected to energy controller 110.

Processing module 114 may include integrated circuits such as FPGA (Field Programmable Gate Array), SoC (System on Chip), etc. In examples where devices 132 are connected to energy controller 110, processing module 114 may receive device data 138 from devices 132 through interface module 112. As further described below, each item of device data 138 may include data that may be effective to indicate energy consumption by a device among devices 132. For example, device data 138a may include indications, such as data and values, effective to indicate energy consumption by device 132a. In some examples, indications that may be included in device data 138a may be a number of applications being executed by device 132a, a number of applications being suspended (further described below) by device 132a, etc. Processing module 114 may determine a rate in which device 132a consumes energy, and may estimate an amount of energy to be consumed by device 132a within a future period of time, based on device data 138a.

In some examples, device data 138 may be further effective to indicate types of batteries being used by devices 132, and/or may indicate current energy quantity, such as an amount of energy remaining in batteries of devices 132. For example, device data 138a may be effective to indicate that device 132a includes a LiPo (Lithium-ion Polymer) battery, and may indicate that the LiPo battery of device 132a has 20% of battery life remaining. In some examples, processing module 114 may be configured to identify a battery type indicated by device data 138, and in response, may retrieve data from a battery database 119 that may be stored in memory 118. In some examples, battery database 119 may include data effective to indicate characteristics, such as a minimum electric quantity threshold, a charge voltage range, a battery loss rate, etc., of different types of batteries. For example, battery database 119 may include characteristics of a LiPo battery, a Lithium-ion battery, a NiCd (Nickel Cadmium) battery, a NiMH (Nickel Metal Hydride) battery, etc. Processing module 114 may be further configured to evaluate device data 138, and based on the evaluation, generate one or more control signals 150 that may be effective to control components (e.g., switches) of control module 116. In some examples, evaluation of device data 138 may include a comparison of different items of device data 138. In some examples, evaluation of device data 138 may include assigning devices 132 to energy deficiency levels (further described below) in order to generate control signal 150, where the assignment of devices 132 to energy deficiency levels may be based on a comparison of different items of device data 138.

Control module 116 may include electronic circuits and/or switches effective to facilitate an allowance and/or an interruption of the transmission of source energy 104 to and/or from devices 132. Operations of control module 116 may be based on control signal 150 received from processing module 114. As will be further described below, in an example, control signal 150 may be effective to activate a first switch of control module 116 to allow a transmission of energy 104 from energy source 102 to device 132b. In another example, control signal 150 may be effective to deactivate a second switch of control module 116 to interrupt a transmission of energy 104 from energy source 102 to device 132a.

Figure 2:
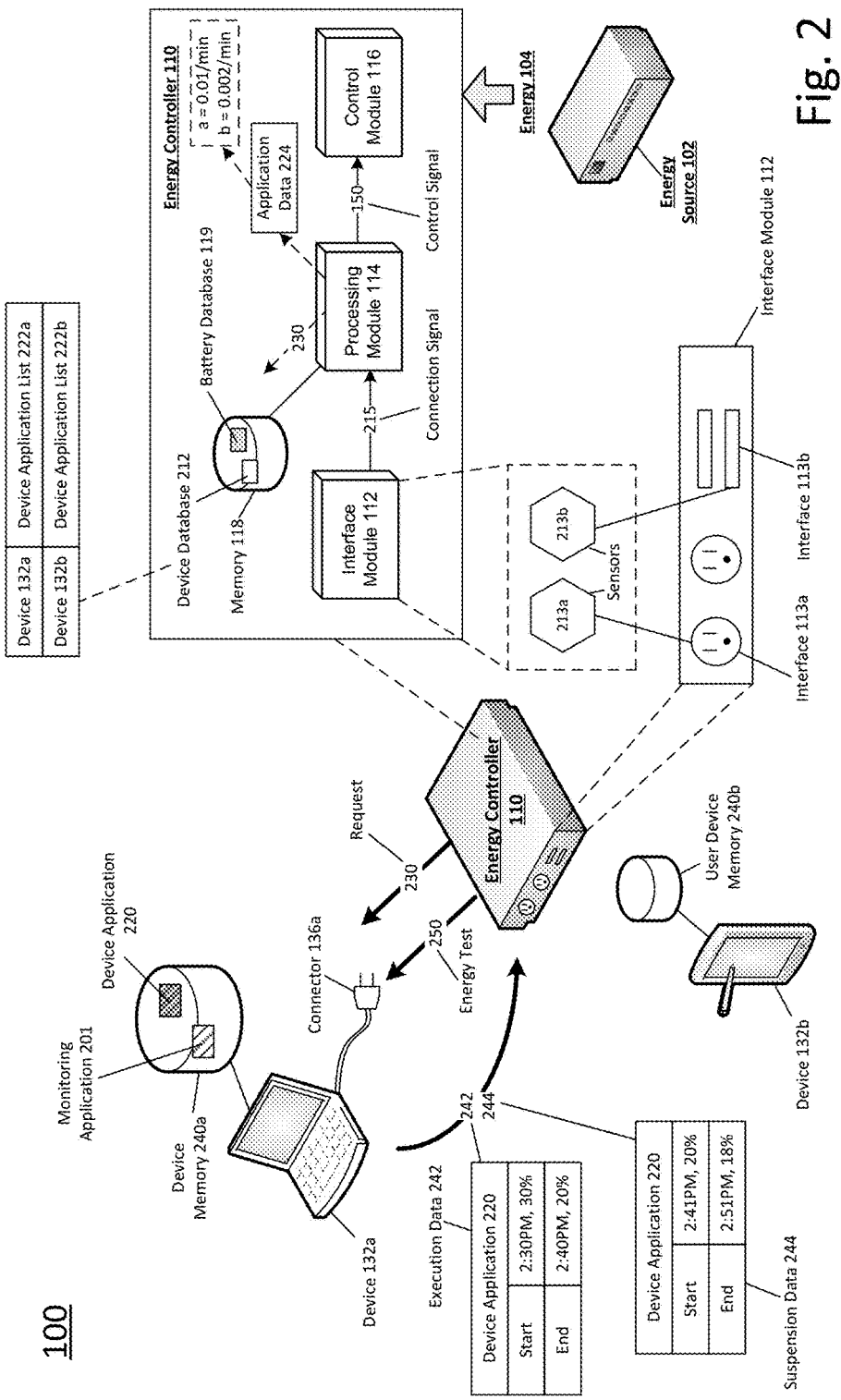
FIG. 2 illustrates the example system of FIG. 1 with additional detail relating to a generation of application data.

FIG. 2 illustrates example system 100 of FIG. 1 with additional detail relating to a generation of application data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As will be described in more detail below, prior to receipt of device data 138 at energy controller 110 from devices 132, energy controller 110 may execute an energy test 250 on devices 132. Energy test 250 may be a set of instructions effective to instruct devices 132 to collect data, such as execution data 242 and/or suspension data 244 that may be associated with application data 224. Application data 224 may be generated by energy controller 110, and may be related to an amount of energy consumed by devices 132 during various states of device applications installed in devices 132. Device applications of devices 132 may be under an execution state, a suspension state, a terminated state, etc. In an example, a device application 220 may be stored in a device memory 240a of device 132a. An execution state of device application 220 may be a state in which device application 220 is currently being executed by device 132a. A suspension state of device application 220 may be a state in which device application 220 is not being executed by device 132a, but data associated with device application 220 is cached in device memory 240a of device 132a. In some examples, a suspension state of device application 220 may be a state in which a first portion of device application 220 is being executed by device 132a, and a second portion of device application 220 is not being executed. A terminated state of device application 220 may be a state in which device application 220 is currently not being executed by device 132a and data associated with device application 220 is currently not being cached in device memory 240a of device 132a. Device 132a may consume energy at a first rate during an execution state of device application 220, at a second rate during a suspension state of device application 220, and at a third rate during a terminated state of device application 220. Application data 224 of device application 220 may include indications of the first, second, and third rate in which device 132a may consume energy.

In an example, interface module 112 may be configured to detect a connection of devices 132 to energy controller 110. Interface module 112 may include one or more sensors such as sensors 213 (including sensor 213a, 213b). Each sensor 213 may be configured to be in communication with a respective interface 113. For example, sensor 213a may be configured to be in communication with interface 113a, and sensor 213b may be configured to be in communication with interface 113b. Sensor 213a may be configured to detect a connection of a device to interface 113a and sensor 213b may be configured to detect a connection of a device to interface 113b. In some examples, sensors 213 may each be mechanical sensors such as a mechanical switch.

In response to the detection of the connection of devices 132 to energy controller 110, interface module 112 may generate a connection signal 215 that may be effective to indicate which interface among interfaces 113 is connected to a device 132. Connection signal 215 may be a series of binary signals, a bit vector, a string of identifications of interfaces 113, etc. For example, if interface module 112 includes two interfaces (113a, 113b), connection signal 215 may be a bit vector of a length of two. If interface module 112 includes four interfaces, connection signal 215 may be a bit vector of a length of four. In the example, when device 132a is connected to interface 113a, sensor 213a may detect the connection and generate a binary signal, such as "1". Interface module 112 may generate connection signal 215 to be "01" to indicate that a device is connected to interface 113a, but no device is connected to interface 113. Interface module 112 may send connection signal 215 to processing module 114. In some examples, identification numbers, such as serial numbers, may be assigned to each interface 113.

Processing module 114 may receive connection signal 215 and, based on connection signal 215, may determine that a device may be connected to interface 113a. In some examples, memory 118 of energy controller 110 may include a map that may indicate correspondence between each interface 113 and each bit position of connection signal 215. For example, memory 118 may include a map that may be effective to indicate that a least significant bit of connection signal 215 ("01") may correspond to interface 113a. Processing module 114 may be further configured to analyze the map stored in memory 118 in order to determine that a device may be connected to interface 113a. In response to the determination that a device is connected to interface 113a, energy controller 110, or processing module 114, may send a request 230 to the device connected to interface 113a to request an identification of the device connected to interface 113a. Request 230 may further be a request for an indication related to a presence of a monitoring application 201 in the device connected to interface 113a. Monitoring application 201 may be an application that may include instructions effective to instruct devices 132 to collect and/or generate device data 138 in order to implement system 100. In some examples, device 132a may respond to request 230 to indicate that device 132a may not include monitoring application 201. In response to an absence of monitoring application 201 in device 132a, processing module 114 may send monitoring application 201 to device 132a or may send instructions and data to device 132a to facilitate an installation of monitoring application 201 in device 132a.

In an example, device 132a may respond to request 230 to indicate that device 132a includes monitoring application 201, and may send an identification of device 132a to energy controller 110. Monitoring application 201 may be stored in device memory 240a of device 132a. Processing module 114, in response to learning of the presence of monitoring application 201 in device 132a, may search for the identification of device 132a in device database 212. Device database 212 may include data such as identification of devices 132 and/or device application lists 222 (including device application list 222a, 222b) of devices 132. Device application lists 222 may include indications, or one or more lists, of device applications installed in each device among devices 132. For example, device 132a may include fifty different device applications, and device application list 222a may include indications of the fifty device applications. In some examples, device database 212 may include application data 224 (further described below) for each device application included in device application list 222a. Continuing with the example, processing module 114 may locate device application list 222a in device database 212 based on the identification of device 132a. In response to locating device application list 222a, processing module 114 may request device 132a to provide indications of device applications that may be different from device applications indicated by device application list 222a. In the example, device application 220 of device 132a may be a device application not indicated by device application list 222a. In response to device application 220 not being indicated by device application list 222a, processing module 114 may perform energy test 250 on device 132a to determine application data 224 for device application 220 and device 132a.

Prior to execution of energy test 250 on device 132a, processing module 114 may determine by, for example, communicating with device 132a, whether a device application is being executed by device 132a. When no device application is being executed by device 132a, processing module 114 may determine by, for example, communicating with device 132a, whether a device application is being suspended, or in a suspended state, by device 132a. When no device application is being suspended, or executed, processing module 114 may wait until a device application is being executed by device 132a in order to execute energy test 250. In some examples, processing module 114 may instruct device 132a to execute device applications of device 132a successively in order to execute energy test 250.

In the example, when device 132a starts an execution of device application 220, processing module 114 may detect the execution of device application 220 by, for example, receiving a signal or message from device 132a. Instructions of energy test 250 may instruct device 132a to terminate device applications which are different from device application 220 in order for device 132a to generate execution data 242. In some examples, energy controller 110 may send an instruction different from instructions of energy test 250 to instruct device 132a to terminate device applications which are different from device application 220. Execution data 242 may include an indication of a start energy quantity of device 132a at a start time of execution of device application 220, and may include an indication of an end energy quantity of device 132a at an end time of execution of device application 220. For example, execution data 242 may indicate that device 132a has thirty percent energy remaining at a start time of 2:30 PM, and device 132a has twenty percent energy remaining at an end time of 2:40 PM. Device 132a may send execution data 242 to processing module 114 through interface 113a of interface module 112. Processing module 114 may receive execution data 242 and may store execution data 242 in memory 118.

In response to the completion of execution of device application 220, instructions of energy test 250 may instruct device 132a to maintain device application 220 in a suspended state for a period of time. Instructions of energy test 250 may further instruct device 132a to maintain device applications different from device application 220 in a terminated state for the period of time. For example, instructions of energy test 250 may instruct device 132a to maintain device application 220 in suspended state for ten minutes. In some examples, energy controller 110 may detect a suspension state of device application 220 after an execution of device application 220. For example, device 132a may send a message to energy controller 110 in response to a completion of execution of device application 220 to notify energy controller 110 that device application 220 may now go into a suspended state. In some examples, device 132a may send a message to energy controller 110 to indicate that device application 220 is in suspended state, and device applications different from device application 220 are in terminated state. Energy controller 110 may receive the message from device 132a in order to detect, or determine, that device application 220 is in a suspended state. Device 132a may generate suspension data 244, where suspension data 244 may include an indication of a start energy quantity of device 132a at a start time of suspension of device application 220, and may include an indication of an end energy quantity of device 132a at an end time of suspension of device application 220. Suspension data 244 may indicate that device 132a has twenty percent energy remaining at a start time of 2:41 PM, and device 132a has eighteen percent energy remaining at an end time of 2:51 PM. Device 132a may send suspension data 244 to processing module 114 through interface 113a of interface module 112. Processing module 114 may receive suspension data 244 and may store suspension data 244 in memory 118.

Processing module 114 may generate application data 224 for device application 220 and device 132a based on execution data 242 and suspension data 244. For example, processing module 114 may determine a difference between energy quantities indicated by execution data 242, such as ten percent. Processing module 114 may further determine a difference between the start time and the end time indicated by execution data 242, such as ten minutes. Processing module 114 may divide ten percent by 10 minutes to determine that device application 220 may cause device 132a to consume energy at a rate of one percent per minute (denoted as a=0.01/min) during an execution of device application 220. Similarly, processing module 114 may determine a difference between energy quantities indicated by suspension data 244, such as two percent. Processing module 114 may further determine a difference between the start time and the end time indicated by suspension data 244, such as ten minutes. Processing module 114 may divide two percent by 10 minutes to conclude that device application 220 may cause device 132a to consume energy at a rate of 0.2 percent per minute (denoted as b=0.002/min) during a suspension of device application 220. Processing module 114 may further store application data 224 in memory 118. As will be described in more detail below, energy controller 110 may control the distribution of energy 104 to devices 132 based on application data 224.

Figure 3:
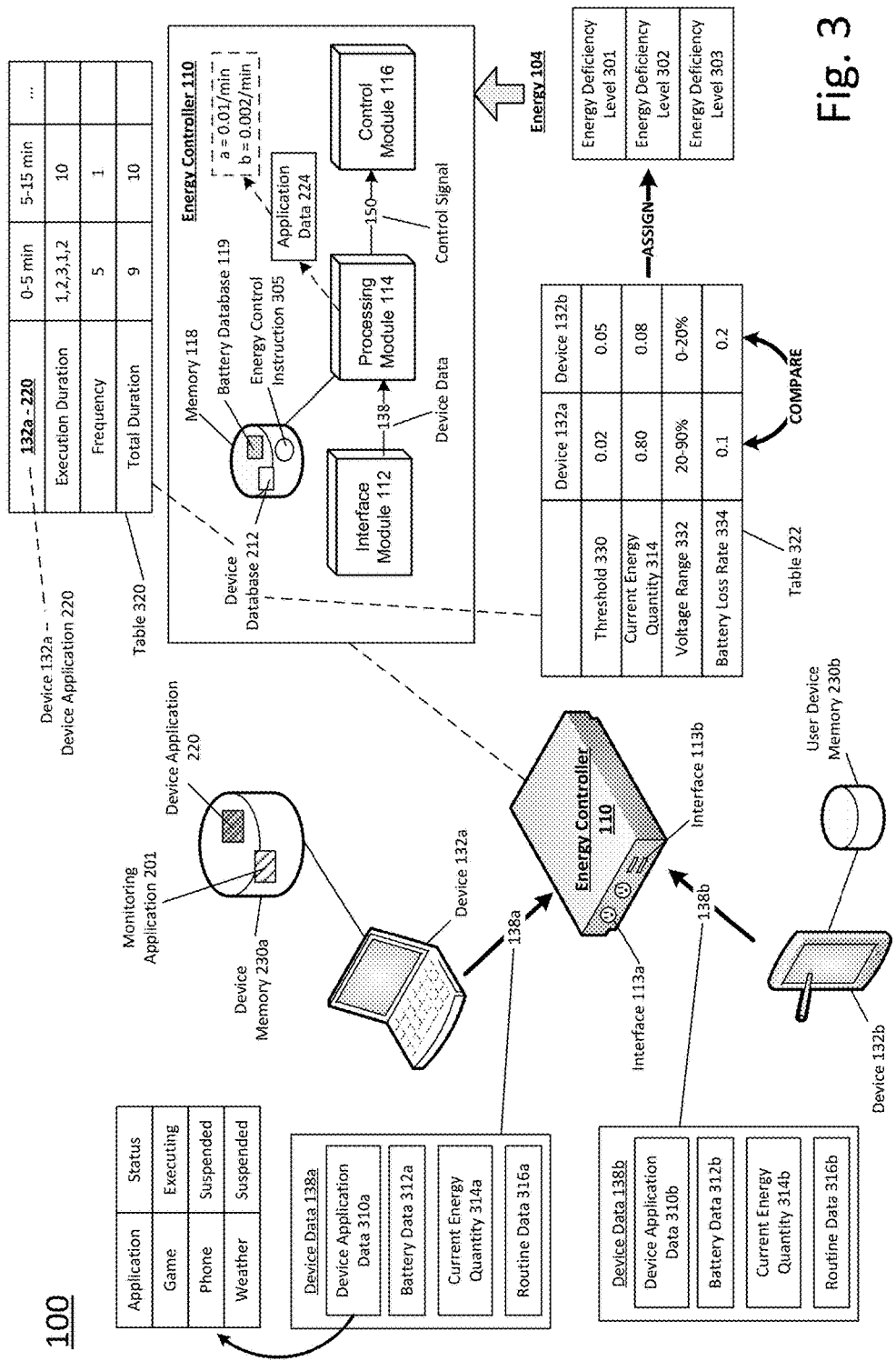
FIG. 3 illustrates the example system of FIG. 1 with additional detail relating to a generation of control signals effective to control energy flow.

FIG. 3 illustrates example system 100 of FIG. 1 with additional detail relating to a generation of control signals effective to control energy flow, arranged in accordance with at least some embodiments described herein. FIG. 3 is substantially similar to system 100 of FIGS. 1-2, with additional details. Those components in FIG. 3 that are labeled identically to components of FIGS. 1-2 will not be described again for the purposes of clarity.

Each item of device data 138 received at energy controller 110 may include data effective to facilitate generation of control signal 150 by processing module 114. In the example, device 132a may generate and/or aggregate device data 138a based on monitoring application 201. Similarly, device 132b may generate and/or aggregate device data 138b based on monitoring application 201. Device data 138a may include device application data 310a, battery data 312a, current energy quantity 314a, and/or routine data 316a. Similarly, device data 138b may include device application data 310b, battery data 312b, current energy quantity 314b, and/or routine data 316b. Focusing on device data 138a, device application data 310a may be effective to indicate a current status of device applications installed in device 132a. For example, device application data 310a may indicate that device 132a may be currently executing a game application, and may be currently suspending a phone application and a weather application of device 132a. Device applications and corresponding status indicated by device application data 310a may be effective to indicate a rate of energy consumption by device 132a. Battery data 312a may be effective to indicate a battery type of a battery of device 132a. Current energy quantity 314a may be effective to indicate a current amount of energy remaining in a battery of device 132a. Routine data 316a may be effective to indicate a routine, such as a frequency, of execution of device applications by device 132a.

In response to receiving device data 138a, processing module 114 may update device database 212 based on device data 138a. Device database 212 may further include one or more tables that may be configured to represent one or more portions of device data 138. In the example, device database 212 may include a table 320 that may be configured to represent routine data 316a. For example, device application 220 may be an Internet browser application of device 132a, of routine data 316a of device data 138a may include durations of executions of device application 220 within a recent hour. Processing module 114 may update table 320 of device application 220 and device 132a in response to receiving routine data 316a. In the example, table 320 may indicate device application 220 has been executed six times in the recent hour, where duration of each execution is 1 minute, 2 minutes, 3 minutes, 1 minute, 2 minutes, and 10 minutes. Processing module 114 may partition routine data 316a into different duration periods represented by table 320. For example, five of the six executions may be partitioned into a duration period of 0 to 5 minutes, and the remaining execution may be partitioned into a duration period of 5 to 15 minutes. In some examples, processing module 114 may include a timer configured to measure a duration of an execution of a device application by a device. In some examples, processing module 114 may include a counter configured to count a number of executions of a device application by a device within a time period.

In the example, device database 212 may further include a table 322 that may be configured to represent battery data 312a and current energy quantity 314a. For example, battery data 312a may indicate that device 132a includes a LiPo battery and current energy quantity 314 may indicate that device 132a has eighty percent energy remaining. In response to receiving battery data 312a, processing module 114 may retrieve data associated with LiPo battery from battery database 119 and may update table 322 based on the data associated with LiPo battery and based on current energy quantity 314a. In the example, table 322 may indicate a threshold 330, current energy quantity 314, a voltage range 332, and/or a battery loss rate 334, etc. Threshold 330 indicated by table 322 may be a threshold related to an energy quantity in which a battery of a particular battery type may be damaged. For example, a LiPo battery may be associated with a battery threshold of two percent (denoted as 0.02), where the LiPo battery may be damaged if a current energy quantity falls below two percent. Voltage range 332 indicated by table 322 may be related to a voltage range of a charging mode of a battery of a particular battery type. For example, a NiCad battery may need to be charged at a constant current equal to ten percent of an ampere-hour capacity of a fully charged battery. Battery loss rate 334 indicated by table 322 may be data stored in battery database 119 and may relate to a self-discharge rate of a battery of a battery type. In some examples, a self-discharge of a battery may be based on a battery type of the battery, a current energy quantity of the battery, a current charging mode of the battery, a current temperature, etc.

Processing module 114 may evaluate, or compare, device data 138a, 138b by, for example, evaluating, or comparing, data in tables 320, 322 in order to control the distribution of energy 104 to devices 132a, 132b. Processing module 114 may further assign each device 132 to an energy deficiency level based on the evaluation of device data 138. In an example, processing module 114 may assign each device 132 to one energy deficiency level among energy deficiency levels 301, 302, and 303. In the example, a device may be assigned to energy deficiency level 301 when a current energy quantity of the device is approaching a battery threshold of a battery of the device. Energy deficiency level 301 may indicate that a device needs energy, or needs to be charged, immediately. In the example, a device may be assigned to energy deficiency level 302 when device application data of a device indicates a relatively large number of device applications being executed or suspended by the device. Energy deficiency level 302 may indicate that a device needs energy, or needs to be charged, but the charge may not be needed immediately. In the example, a device may be assigned to energy deficiency level 303 when a current energy quantity of the device is relatively far from approaching a battery threshold of a battery of the device, and when a relatively small number of device applications are being executed or suspended by the device. Energy deficiency level 303 may indicate that a device may not need energy immediately, and may indicate that energy controller 110 should interrupt a transmission of energy 104 to the device. Conditions to assign devices to energy deficiency levels 301, 302, 303 may be indicated by energy control instructions 305 of monitoring application 201 that may be stored in memory 118 of energy controller 110. In some examples, processing module 114 may not assign a device to an energy deficiency level, and may generate a request for a discharge of energy from the device that is not assigned to an energy deficiency level (further described below). In some examples, an administrator of system 100 may add or remove energy deficiency levels, or may modify conditions to assign devices to energy deficiency levels.

In the example, processing module 114 may evaluate data in tables 320, 322 and may determine that current energy quantity of device 132b may be approaching threshold 330 of device 132b. Processing module 114 may further determine that a current energy quantity of device 132a may not be approaching threshold 330 of device 132a. Processing module 114 may further compare a number of device applications being executed and suspended by device 132a with a number of device applications being executed and suspended by device 132b. For example, device 132a may be executing one device application and suspending five device applications, and device 132b executing one device application and suspending ten device applications. Processing module 114 may further determine, based on routine data 316a represented by table 320, that device 132a may be executing a device application that may be executed for an average of two minutes. Processing module 114 may further determine, based on routine data 316b represented by table 320, that device 132b may be executing a device application that may be executed for an average often minutes.

Processing module 114 may further evaluate device data 138 based on application data 224 in order to estimate an amount of energy that may be consumed by devices 132 within a future period of time. For example, when device application 220 is the only device application being executed by device 132a, processing module 114 may retrieve application data 224, associated with device application 220 and device 132a, from memory 118. Processing module 114 may determine that device 132a may consume ten percent of energy within a next ten minutes based on the indication by application data 224 that device application 220 may cause device 132a to consume one percent of energy per minute.

In another example, device 132a may be executing one device application and may be suspending four device applications. Processing module 114 may estimate an amount of energy that may be consumed by device 132a within a future period of time T based on the following example model:

$$R=T(e_1+s_2+s_3+s_4+s)$$

Where R may denote the amount of energy that may be consumed by a device i (in the example, device 132a), T may denote the future period of time, $e_i$ may denote the energy consumption rate of an execution of a device application i ($e_i$ may be indicated by application data 224), and $s_i$ may denote the energy consumption rate of a suspension of a device application i ($s_i$ may be indicated by application data 224). If R=10(0.01+0.001+0.003+0.001+0.001), which results in R=0.16, or sixteen percent, which may indicate that device 132a may consume sixteen percent of energy within a next ten minutes. If device 132a has less than, or approximately, sixteen percent of energy remaining, processing module 114 may determine that device 132a requires energy in an urgent manner.

Processing module 114 may further determine a remaining time in which a device may continue to run under normal conditions based on the example model:

$$T'=(R-R')/(e_1+e_2+s_3+s_4+s_5)$$

Where T' may denote the remaining time in which a device i may continue to run under normal conditions and R' may denote current energy quantity 314 of the device. In the example above, if device 132a has twenty percent of energy remaining (R'=0.20), then T'=2.5, which may indicate that device 132a has approximately 2.5 minutes remaining in which device 132a may run under normal conditions. Processing module 114 may further determine whether it may be appropriate for a device application to continue being executed on a device based on T'. For example, routine data 316a may indicate that device application 220 may be often executed within a duration of 0-5 minutes. If the value of T' for device application 220 and device 132a is 2.5 minutes, and within the range of 0-5 minutes, then processing module 114 may determine that it may be appropriate for device 132a to continue the execution of device application 220. If the value of T' for device application 220 and device 132a is 10 minutes, and not within the range of 0-5 minutes, then processing module 114 may determine that it may be not appropriate for device 132a to continue the execution of device application 220.

Based on the evaluation on device data 138 and application data 224, processing module 114 may determine that device 132b may be in greater demand for energy compared to device 132a. Processing module 114 may assign device 132b to energy deficiency level 301, and may assign device 132a to energy deficiency level 303, in response to the evaluation of data in tables 320, 322, and/or application data 224.

Processing module 114 may generate control signal 150 based on the assignment of devices 132 to energy efficiency levels 301, 302, 303. Control signal 150 may be a series of binary signals, a bit vector, etc. For example, if control module 116 includes two switches, control signal 150 may be a bit vector of a length of two. If control module 116 includes four interfaces, control signal 150 may be a bit vector of a length of four. In the example, processing module 114 may generate control signal 150 to allow a transmission of energy 104 to device 132b based on the assignment of device 132b to energy deficiency level 301. Similarly, processing module 114 may generate control signal 150 to interrupt a transmission of energy 104 to device 132a based on the assignment of device 132a to energy deficiency level 303. In the example, where control signal 150 may be a bit vector of a length of two, control signal 150 may be "01", where the least significant bit ('1') may be effective to activate a switch in control module 116 that corresponds to interface 113b, and the most significant bit ('0') may be effective to deactivate a switch in control module 116 that corresponds to interface 113a.

In some examples, processing module 114 may receive an update on device data 138 periodically, such as at intervals of 15 minutes, 30 minutes, etc. In response to receiving updated device data 138, processing module 114 may reassign devices to energy efficiency levels. For example, an updated version of device data 138a may be received where current energy quantity 314a is lowered to fifty percent and device application data 310a indicates a suspension of twenty device applications. Processing module 114, based on the updated version of device data 138a, may reevaluate device data 138a and device data 138b, and may reassign device 132a to energy deficiency level 302. Processing module 114 may further regenerate control signal 150 based on the reassignment of device 132a to energy deficiency level 302. In some examples, when two or more devices are assigned to a same energy deficiency level, processing module 114 may execute energy control instructions 305 to rank the two or more devices. For example, if devices 132a, 132b are both assigned to energy deficiency level 301, processing module 114 may rank devices 132a, 132b in order to determine which device should receive energy 104 first. Processing module 114 may rank devices 132a, 132b based on current energy quantity 314. If an current energy quantity 314 of device 132b is less than an current energy quantity 314 of device 132a, then device 132b may be ranked higher than device 132a and may receive a high charging priority. In some examples, processing module 114 may further rank devices 132 based on device data 138 and/or application data 224.

Figure 4:
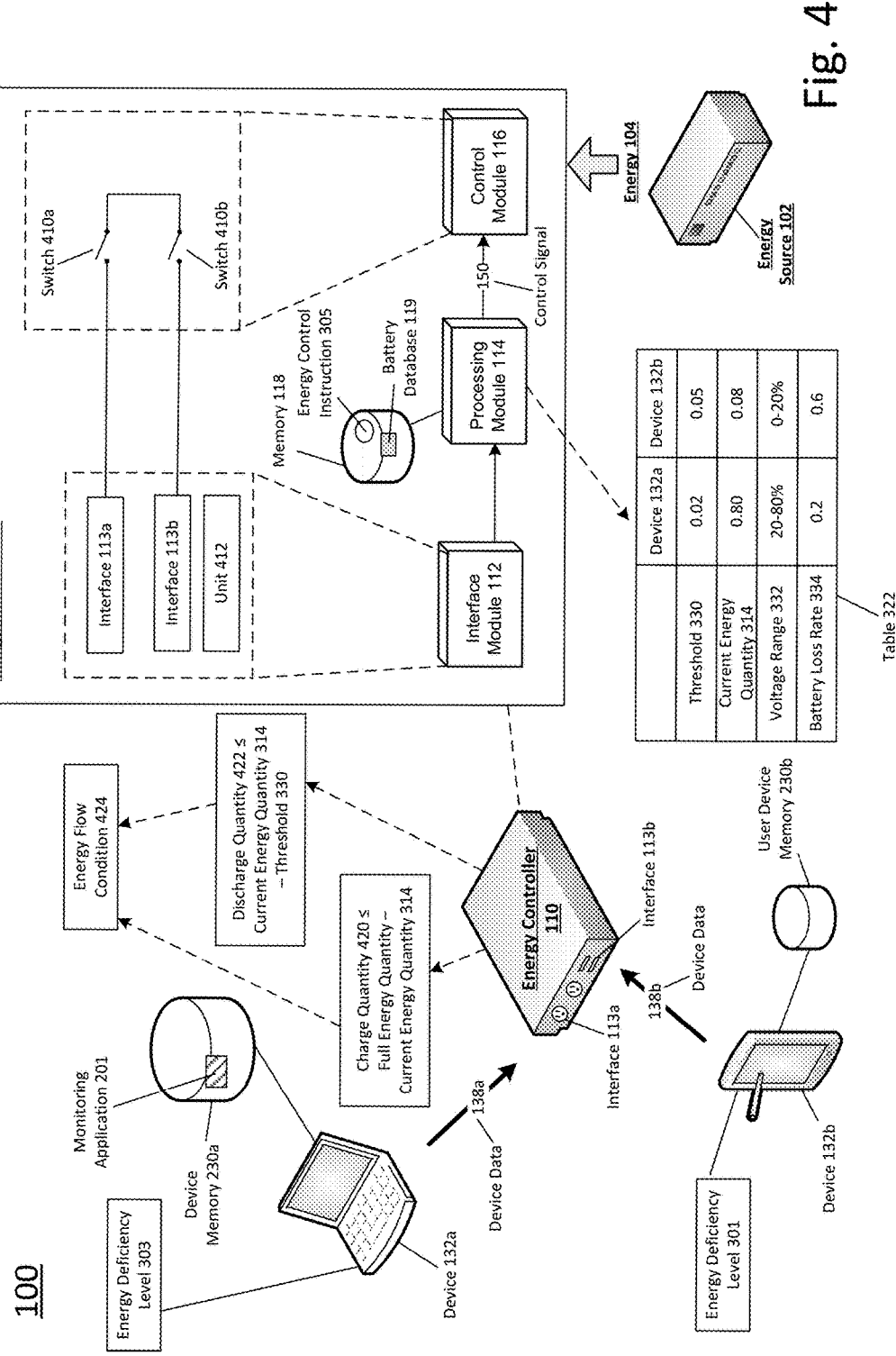
FIG. 4 illustrates the example system of FIG. 1 with additional detail relating to control of a distribution of energy.

FIG. 4 illustrates example system 100 of FIG. 1 with additional detail relating to control a distribution of energy, arranged in accordance with at least some embodiments described herein. FIG. 4 is substantially similar to system 100 of FIGS. 1-3, with additional details. Those components in FIG. 4 that are labeled identically to components of FIGS. 1-3 will not be described again for the purposes of clarity.

Control module 116 may receive control signal 150 from processing module 114. In the example, control module 116 may include one or more switches 410 (including switch 410a and switch 410b). Switch 410a may be configured to be in communication with interface 113a of interface module 112. Switch 410b may be configured to be in communication with interface 113b of interface module 112. In an example where control signal 150 may be "10", control signal 150 may be effective to deactivate switch 410a and activate switch 410b. When switch 410a is deactivated, energy 104 may be not be transmitted from energy source 102 to device 132a through interface 113a. When switch 410b is activated, energy 104 may be transmitted from energy source 102 to device 132b through interface 113b. In another example where control signal 150 may be "11", control signal 150 may be effective to activate switches 410a, 410b. In another example where control signal 150 may be "10", and device 132a is not assigned to an energy deficiency level, processing module 114 may send a request to device 132a to discharge energy to device 132b. When energy is discharged from device 132a, interface module 112 may receive the discharged energy from device 132a and may transmit the discharged energy to device 132b. In some examples, interface module 112 may further include a unit 412, where unit 412 may include a controller configured to facilitate receipt and/or transmission of energy among devices 132. Unit 412 may be configured to be in communication with interfaces 113. In some examples, unit 412 may further include an energy storage component configured to store the discharged energy from device 132a.

In another example, where device 132b is assigned to energy deficiency level 301 and device 132a is not assigned to an energy deficiency level, processing module 114 may further determine a charge quantity 420 and a discharge quantity 422. Charge quantity 420 may be an amount of energy 104 to be transmitted to device 132b, and discharge quantity 422 may be an amount of quantity of energy to be discharged by 132a. Energy control instruction 305 may include an energy flow condition 424 that may be a condition effective to indicate a balanced energy flow among devices 132. For example, energy flow condition 424 may be represented by:

$$f = a_1 x_1 + a_2 x_2 + a_3 x_3 + \ldots$$

where f may represent energy flow condition 424; $a_i$ may represent battery loss rate 334 of a device of an index i, for example, $a_1$ may represent battery loss rate 334a of device 132a and $a_2$ may represent battery loss rate 334b device 132b; and $x_i$ may represent charge quantity 420 or discharge quantity 422 for a corresponding device of index i.

Processing module 114 may execute energy control instruction 305 to determine a constraint on charge quantity 420 and/or a constraint on discharge quantity 422 of devices 132. Constraints on charge quantity 420 and discharge quantity 422 may be effective to define a optimal solution of energy flow condition 424, which may relate to a minimum amount of energy loss experienced by system 100. In an example, a particular device may be assigned to energy deficiency level 301 or energy deficiency level 302, which requires charging. A constraint on charge quantity 420 for the particular device may be to limit charge quantity 420 to less than, or equal to, a difference between a full energy quantity and current energy quantity 314 of the particular device. A full energy quantity of a device may be one hundred percent (denoted as 1) of energy remaining in a battery of the device. For example, when device 132b is assigned to energy efficiency level 301, a constraint on a charge quantity 420 of device 132b may be less than, or equal to, "0.92", or "92%" (based on 1-0.08). When a device is not assigned to any energy deficiency level, a constraint on discharge quantity 422 may be to limit discharge quantity 422 to be less than, or equal to, a difference between current energy quantity 314 of the device and threshold 330 of a battery of the device. For example, when device 132a is not assigned to any energy efficiency level, a constraint on a discharge quantity 422 of device 132b may be less than, or equal to, "0.78", or "78%" (based on 0.80-0.02).

Based on battery loss rate 334, energy flow condition 424 may be:

$$f = 0.2 x_1 + 0.6 x_2$$

Processing module 114 may execute energy control instruction 305 to determine a solution for energy flow condition 424 in order to determine $x_1$ (discharge quantity 422) and $x_2$ (charge quantity 420). For example, energy flow condition 424 may be a homogeneous linear equation, and energy control instruction 203 may include instructions to solve energy control condition based on constraints on charge quantity 420 and discharge quantity 422. Processing module 114, in response to determination of charge quantity 420 and discharge quantity 422, may instruct control module 116 to control an amount of energy 104 being transmitted to device 132b based on charge quantity 420, and may request device 132a to discharge a particular amount of energy based on discharge quantity 422.

Among other possible benefits, a system in accordance with the disclosure may provide a controller to control energy flow among a set of devices being charged. A system in accordance with the disclosure may avoid damages to electronic devices. For example, when a first device is fully charged, a controller in accordance with the disclosure may stop charging the first device or may request the first device to provide energy to a second device that may be in need of energy. When devices connected to the controller are full charged, the controller may stop charging the devices to avoid damage to the batteries of the devices. When more than one device requires charging, the controller may determine charging priorities of devices in order to avoid damages to batteries of devices. A system in accordance with the disclosure may also minimize energy loss. For example, when devices connected to the controller are full charged, the controller may stop charging the devices in order to prevent unnecessary charging and prevent energy loss by the system.

Figure 5:
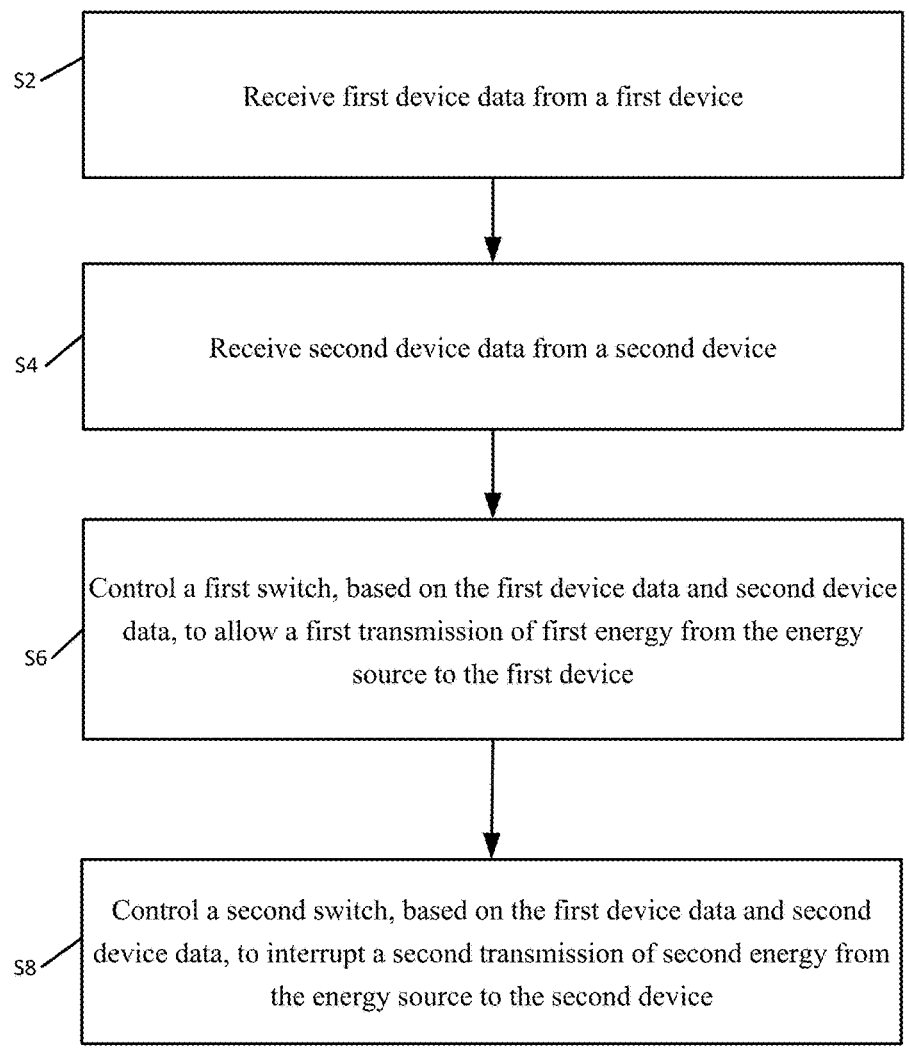
FIG. 5 illustrates a flow diagram for an example process to implement an energy flow controller.

FIG. 5 illustrates a flow diagram for an example process to implement energy flow controller, arranged in accordance with at least some embodiments presented herein. The process in FIG. 5 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive first device data from a first device". At block S2, an energy controller may receive first device data from a first device. The first device data may be effective to indicate a first energy consumption by the first device. The first device data may relate to a first energy quantity of the first device. The first device data may be further effective to indicate a first battery type of a first battery of the first device. The controller may further receive first routine data from the first device. The first routine data may relate to a frequency of execution of a first application by the first device. The controller may retrieve first battery data of the first battery type from a memory.

Processing may continue from block S2 to block S4, "Receive second device data from a second device". At block S4, the energy controller may receive second device data from a second device. The second device data may be effective to indicate a second energy consumption by the second device. The second device data may relate to a second energy quantity of the second device. The second device data may be further effective to indicate a second battery type of a second battery of the second device. The controller may further receive second routine data from the second device. The second routine data may relate to a frequency of execution of a second application by the second device. The controller may retrieve second battery data of the second battery type from the memory.

In some examples, the controller may evaluate the first device data, the second device data, the first routine data, the second routine data, the first battery data, and the second battery data. The controller may assign the first device to a first energy deficiency level based on the evaluation. The controller may assign the second device to a second energy deficiency level based on the evaluation.

Processing may continue from block S4 to block S6, "Control a first switch, based on the first device data and second device data, to allow a first transmission of first energy from the energy source to the first device". At block S6, the controller may control a first switch to allow a first transmission of first energy from an energy source to the first device. In some examples, the controller may generate a first control signal based on the assignment of the first device to the first energy deficiency level. The first control signal may be effective to control the first switch in order to allow the first transmission of the first energy to the first device.

Processing may continue from block S6 to block S8, "Control a second switch, based on the first device data and second device data, to interrupt a second transmission of second energy from the energy source to the second device".

At block S8, the controller may control a second switch to allow a second transmission of second energy from the energy source to the second device. In some examples, the controller may generate a second control signal based on the assignment of the second device to the second energy deficiency level. The second control signal may be effective to control the second switch in order to interrupt the second transmission of the second energy to the second device.

Figure 6:
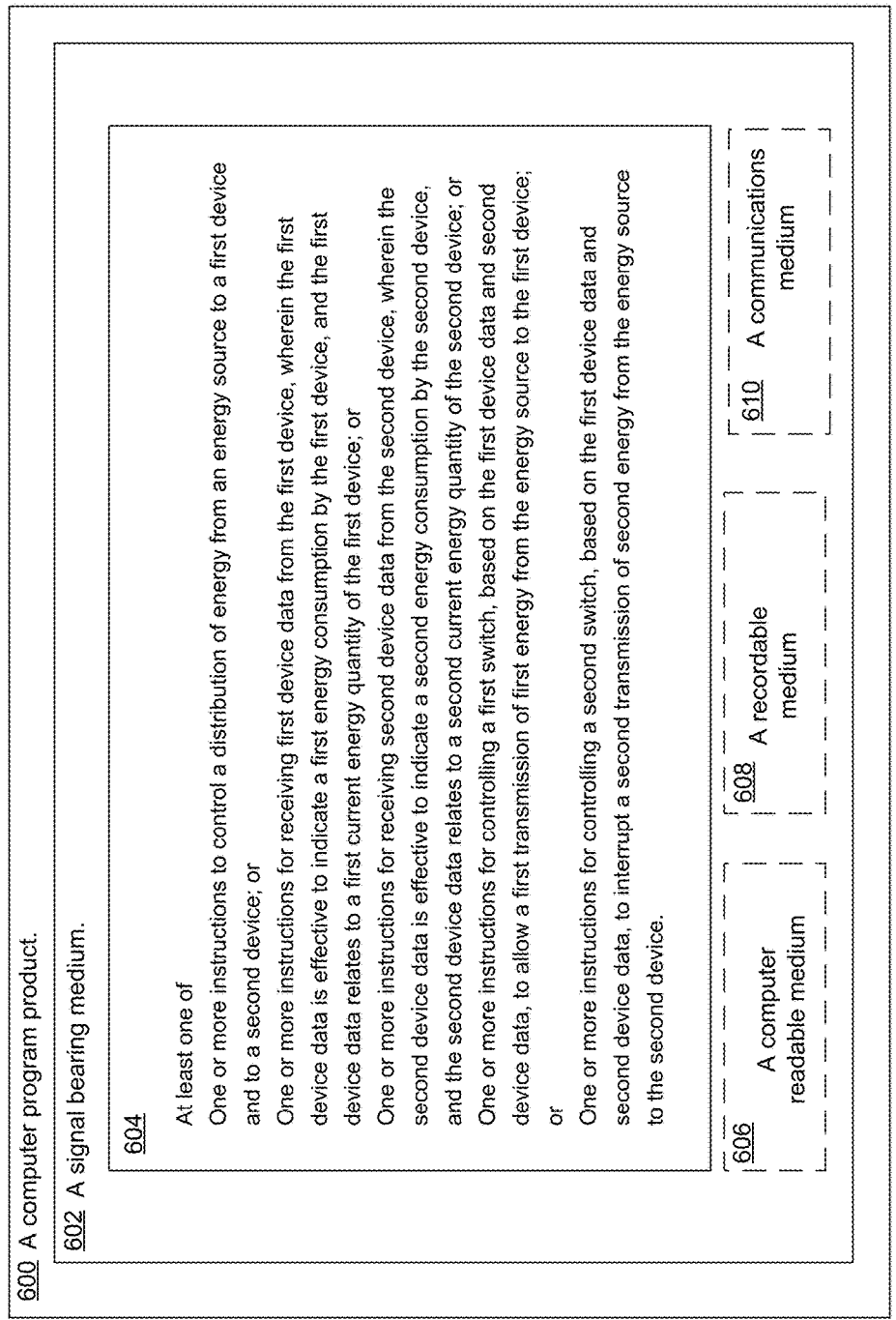
FIG. 6 illustrates an example computer program product that can be utilized to implement an energy flow controller.

FIG. 6 illustrates an example computer program product that can be utilized to implement an energy flow controller, arranged in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. Thus, for example, referring to system 100, processing module 114 of energy controller 110 may undertake one or more of the blocks shown in FIG. 5 in response to instructions 604 conveyed to the system 100 by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement an energy flow controller, arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (P), a microcontroller (C), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include an energy flow controller application 726 that is arranged to perform the functions and operations as described herein including those described with respect to system 100 of FIGS. 1-6. Program data 724 may include energy flow data 728 that may be useful for implementation of an energy flow controller as is described herein. In some embodiments, application 722 may be arranged to operate with program data 724 on operating system 720 such that implementations of an energy flow controller may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM. ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A. B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A. B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to control a distribution of energy from an energy source to a first device and to a second device, the method comprising, by a controller:

receiving first device data and first routine data from the first device, wherein the first device data is effective to indicate a first energy consumption by the first device, and the first device data relates to a first current energy quantity of the first device, and wherein the first routine data relates to a first frequency of execution of a first application by the first device;

receiving second device data and second routine data from the second device, wherein the second device data is effective to indicate a second energy consumption by the second device, and the second device data relates to a second current energy quantity of the second device, and wherein the second routine data relates to a second frequency of execution of a second application by the second device;

controlling a first switch, based on the first device data, the first routine data, the second device data, and the second routine data to allow a first transmission of first energy from the energy source to the first device; and controlling a second switch, based on the first device data, the first routine data, the second device data, and the second routine data to interrupt a second transmission of second energy from the energy source to the second device.

2. The method of claim 1, further comprising, prior to receiving the first device data and the second device data:

detecting an execution of a particular application by the first device;

sending an instruction to the first device to terminate an execution of another application different from the particular application;

receiving execution data related to an amount of energy consumed by the first device during the execution of the particular application by the first device;

detecting a suspension of the particular application by the first device;

receiving suspension data related to an amount of energy consumed by the first device during the suspension of the particular application by the first device; and generating application data related to the particular application and the first device based on the execution data and the suspension data, wherein controlling the first and second switches is further based on the application data.

3. The method of claim 1, further comprising, prior to controlling the first and second switches:

comparing the first device data with the second device data;

assigning the first device to a first energy deficiency level based on the comparison of the first device data with the second device data, wherein the first energy deficiency level indicates a first energy deficiency;

generating a first control signal based on the assignment of the first device to the first energy deficiency level, wherein the first control signal is effective to control the first switch;

assigning the second device to a second energy deficiency level based on the comparison of the first device data with the second device data, wherein the second energy deficiency level indicates a second energy deficiency that is less than the first energy deficiency; and generating a second control signal based on the assignment of the second device to the second energy deficiency level, wherein the second control signal is effective to control the second switch, wherein controlling the first switch comprises controlling the first switch with use of the first control signal, and wherein controlling the second switch comprises controlling the second switch with use of the second control signal.

4. The method of claim 3, further comprising, prior to controlling the first and second switches:

in response to assigning the first device to the first energy deficiency level, determining a first difference between a full energy quantity of the first device and the first current energy quantity of the first device;

in response to assigning the second device to the second energy deficiency level, determining a second difference between a threshold energy quantity of the second device and the second current energy quantity of the second device;

determining a first amount of the first energy for the first device based on the first difference; and determining a second amount of the second energy for the second device based on the second difference.

5. The method of claim 3, further comprising:
receiving third device data from the second device, wherein the third device data is effective to indicate a third energy consumption by the second device, and the third device data relates to a third current energy quantity of the second device;

comparing the first device data with the third device data;

assigning the second device to the first energy deficiency level based on the comparison of the first device data with the third device data; and in response to assigning the second device to the first energy deficiency level:
generating the first control signal to activate the first switch to allow the first transmission of the first energy from the energy source to the first device; and
generating the second control signal to activate the second switch to allow the second transmission of the second energy from the energy source to the second device.

6. The method of claim 1, further comprising:
generating a request for discharged energy from the second device;
sending the request to the second device;
receiving the discharged energy from the second device; and
transmitting the discharged energy to the first device.

7. The method of claim 1, wherein:
the first device data is further effective to indicate a first battery type of a first battery of the first device,
the second device data is further effective to indicate a second battery type of a second battery of the second device, and
the method further comprises:
retrieving first battery data of the first battery type from a memory;
retrieving second battery data of the second battery type from the memory;
evaluating the first device data, the second device data, the first battery data, and the second battery data;
assigning the first device to a first energy deficiency level based on the evaluation, wherein the first energy deficiency level indicates a first energy deficiency;
assigning the second device to a second energy deficiency level based on the evaluation, wherein the second energy deficiency level indicates a second energy deficiency that is less than the first energy deficiency level;
generating a first control signal based on the assignment of the first device to the first energy deficiency level, wherein the first control signal is effective to control the first switch; and
generating a second control signal based on the assignment of the second device to the second energy deficiency level, wherein the second control signal is effective to control the second switch,
wherein controlling the first switch comprises controlling the first switch with use of the first control signal, and
wherein controlling the second switch comprises controlling the second switch with use of the second control signal.

8. A system effective to control a distribution of energy to a first device and to a second device, the system comprising:
a first module comprising:
a first interface effective to connect the first device to an energy source; and
a second interface effective to connect the second device to the energy source;
a second module configured to be in communication with the first module; and
a third module configured to be in communication with the first module and the second module, wherein the third module comprises:
a first switch configured to be in communication with the first interface of the first module, and
a second switch configured to be in communication with the second interface of the first module,
wherein the first module is configured to:
receive first device data from the first device through the first interface, wherein the first device data is effective to indicate a first energy consumption by the first device, and the first device data relates to a first current energy quantity of the first device;
receive second device data from the second device through the second interface, wherein the second device data is effective to indicate a second energy consumption by the second device, and the second device data relates to a second current energy quantity of the second device; and
send the first device data and the second device data to the second module, and wherein the second module is configured to:
control the first switch of the third module by use of a first control signal, based on the first device data and the second device data, to allow a first transmission of first energy from the energy source to the first device, wherein the first control signal is determined based on a first energy deficiency level that corresponds to comparison data of the first device data and the second device data; and
control the second switch of the third module by use of a second control signal, based on the first device data and the second device data, to interrupt a second transmission of second energy from the energy source to the second device, wherein the second control signal is determined based on a second energy deficiency level that corresponds to comparison data of the first device data and the second device data.

9. The system of claim 8, wherein the second module is further configured to:
assign the first device to the first energy deficiency level, wherein the first energy deficiency level indicates a first energy deficiency;
generate the first control signal based on the assignment of the first device to the first energy deficiency level;
assign the second device to the second energy deficiency level, wherein the second energy deficiency level indicates a second energy deficiency that is less than the first energy deficiency;

generate the second control signal based on the assignment of the second device to the second energy deficiency level;
send the first control signal to the third module; and
send the second control signal to the third module.

10. The system of claim 9, wherein the second module is further configured to:
in response to the assignment of the first device to the first energy deficiency level, determine a first difference between a full energy quantity of the first device and the first current energy quantity of the first device;
in response to the assignment of the second device to the second energy deficiency level, determine a second difference between a threshold energy quantity of the second device and the second current energy quantity of the second device;
determine a first amount of the first energy for the first device based on the first difference; and
determine a second amount of the second energy for the second device based on the second difference.

11. The system of claim 9, wherein:
the first module is further configured to:
receive third device data from the second device, wherein the third device data is effective to indicate a third energy consumption by the second device, and the third device data relates to a third current energy quantity of the second device; and
send the third device data to the second module; and
the second module is further configured to:
compare the first device data with the third device data;
assign the second device to the first energy deficiency level based on the comparison of the first device data with the third device data; and
in response to the assignment of the second device to the first energy deficiency level:
generate the first control signal to activate the first switch to allow the first transmission of the first energy from the energy source to the first device; and
generate the second control signal to activate the second switch to allow the second transmission of the second energy from the energy source to the second device.

12. The system of claim 8, wherein the second module is further configured to:
generate a request for discharged energy from the second device;
instruct the first module to send the request to the second device;
receive a message from the first module, wherein the message is effective to indicate a receipt of the discharged energy at the first module from the second device; and
instruct the first module to transmit the discharged energy to the first device.

13. The system of claim 8, wherein:
the first device data is further effective to indicate a first battery type of a first battery of the first device,
the second device data is further effective to indicate a second battery type of a second battery of the second device, and
the system further comprises:
a memory configured to be in communication with the second module, wherein the memory is configured to:
store first battery data of the first battery type; and
store second battery data of the second battery type; and
the second module is further configured to:
retrieve the first battery data of the first battery type from the memory;
retrieve the second battery data of the second battery type from the memory;
evaluate the first device data, the second device data, the first battery data, and the second battery data;
assign the first device to a first energy deficiency level based on the evaluation, wherein the first energy deficiency level indicates a first energy deficiency;
assign the second device to a second energy deficiency level based on the evaluation, wherein the second energy deficiency level indicates a second energy deficiency that is less than the first energy deficiency level;
generate a first control signal based on the assignment of the first device to the first energy deficiency level, wherein the first control signal is effective to control the first switch;
generate a second control signal based on the assignment of the second device to the second energy deficiency level, wherein the second control signal is effective to control the second switch;
send the first control signal to the third module; and
send the second control signal to the third module.

14. An energy controller effective to control a distribution of energy to a first device and to a second device, the energy flow controller comprising:
an energy source configured to store the energy;
a first interface effective to connect the first device to the energy source, wherein the first interface is configured to receive first device data from the first device, and wherein the first device data is effective to indicate a first energy consumption by the first device, and the first device data relates to a first current energy quantity of the first device;
a second interface effective to connect the second device to the energy source, wherein the second interface is configured to receive second device data from the second device, and wherein the second device data is effective to indicate a second energy consumption by the second device, and the second device data relates to a second current energy quantity of the second device;
a processor configured to be in communication with the first interface and the second interface;
a first switch configured to be in communication with the first interface and the processor; and
a second switch configured to be in communication with the second interface and the processor;
wherein the processor is configured to:
control the first switch based on the first device data and the second device data, to allow a first transmission of first energy from the energy source to the first device;
control the second switch based on the first device data and the second device data, to interrupt a second transmission of second energy from the energy source to the second device, and
in response to a determination that the first device is further energy deficient:
generate a request for discharged energy from the second device;
send the request to the second device;
receive the discharged energy from the second device; and
transmit the discharged energy to the first device.

15. The energy controller of claim 14, wherein the processor is further configured to:
- compare the first device data with the second device data;
- assign the first device to a first energy deficiency level based on the comparison of the first device data with the second device data, wherein the first energy deficiency level indicates a first energy deficiency;
- generate a first control signal based on the assignment of the first device to the first energy deficiency level, wherein the first control signal is effective to control the first switch;
- assign the second device to a second energy deficiency level based on the comparison of the first device data with the second device data, wherein the second energy deficiency level indicates a second energy deficiency that is less than the first energy deficiency;
- generate a second control signal based on the assignment of the second device to the second energy deficiency level, wherein the second control signal is effective to control the second switch;
- control the first switch with use of the first control signal; and
- control the second switch with use of the second control signal.

16. The energy controller of claim 15, wherein the processor is further configured to:
- in response to the assignment of the first device to the first energy deficiency level, determine a first difference between a full energy quantity of the first device and the first current energy quantity of the first device;
- in response to the assignment of the second device to the second energy deficiency level, determine a second difference between a threshold energy quantity of the second device and the second current energy quantity of the second device;
- determine a first amount of the first energy for the first device based on the first difference; and
- determine a second amount of the second energy for the second device based on the second difference.

17. The energy controller of claim 15, wherein the second interface is further configured to receive third device data from the second device, and wherein the third device data is effective to indicate a third energy consumption by the second device, and the third device data relates to a third current energy quantity of the second device, and the processor is further configured to:
- compare the first device data with the third device data;
- assign the second device to the first energy deficiency level based on the comparison of the first device data with the third device data; and
- in response to the assignment of the second device to the first energy deficiency level:
  - generate the first control signal to activate the first switch to allow the first transmission of the energy from the energy source to the first device; and
  - generate the second control signal to activate the second switch to allow the second transmission of the energy from the energy source to the second device.

18. The energy controller of claim 14, wherein:
- the first device data is further effective to indicate a first battery type of a first battery of the first device,
- the second device data is further effective to indicate a second battery type of a second battery of the second device,
- the energy controller further comprises:
  - a memory configured to be in communication with the processor, wherein the memory is configured to:
    - store first battery data of the first battery type; and
    - store second battery data of the second battery type; and
- the processor is further configured to:
  - retrieve the first battery data of the first battery type from the memory;
  - retrieve the second battery data of the second battery type from the memory;
  - evaluate the first device data, the second device data, the first battery data, and the second battery data;
  - assign the first device to a first energy deficiency level based on the evaluation, wherein the first energy deficiency level indicates a first energy deficiency;
  - assign the second device to a second energy deficiency level based on the evaluation, wherein the second energy deficiency level indicates a second energy deficiency that is less than the first energy deficiency level;
  - generate a first control signal based on the assignment of the first device to the first energy deficiency level, wherein the first control signal is effective to control the first switch;
  - generate a second control signal based on the assignment of the second device to the second energy deficiency level, wherein the second control signal is effective to control the second switch;
  - control the first switch with use of the first control signal; and
  - control the second switch with use of the second control signal.

* * * * *

UNITED STATES PATENT AND TRADEMARK OFFICE
CERTIFICATE OF CORRECTION

PATENT NO. : 9,923,378 B2  
APPLICATION NO. : 15/031394  
DATED : March 20, 2018  
INVENTOR(S) : Cao et al.

Page 1 of 2

It is certified that error appears in the above-identified patent and that said Letters Patent is hereby corrected as shown below:

In the Specification

In Column 3, Line 17, delete "controller;" and insert -- controller, --, therefor.

In Column 11, Line 34, delete "often" and insert -- of ten --, therefor.

In Column 13, Line 21, delete "illustrates example" and insert -- illustrates an example --, therefor.

In Column 16, Line 12, delete "Program product 600" and insert -- Computer program product 600 --, therefor.

In Column 16, Line 21, delete "medium 602." and insert -- signal bearing medium 602. --, therefor.

In Column 16, Line 24, delete "a hard disk drive," and insert -- a Hard Disk Drive (HDD), --, therefor.

In Column 16, Line 34, delete "program product 600" and insert -- computer program product 600 --, therefor.

In Column 16, Lines 49-50, delete "microprocessor (P), a microcontroller (C)," and insert -- microprocessor (μP), a microcontroller (μC), --, therefor.

In Column 16, Line 52, delete "one more" and insert -- one or more --, therefor.

In Column 16, Line 58, delete "implementations" and insert -- implementations, --, therefor.

In Column 17, Line 33, delete "RAM." and insert -- RAM, --, therefor.

In Column 18, Line 52, delete "recitation" and insert -- recitation, --, therefor.

Signed and Sealed this  
Nineteenth Day of June, 2018

Andrei Iancu  
*Director of the United States Patent and Trademark Office*

CERTIFICATE OF CORRECTION (continued)
U.S. Pat. No. 9,923,378 B2

In Column 19, Line 7, delete "general" and insert -- general, --, therefor.

In Column 19, Line 14, delete "general" and insert -- general, --, therefor.